June 29, 1965     V. H. B. WILHITE ETAL     3,191,426
ROCKET FUEL TESTING APPARATUS
Filed Jan. 9, 1962     2 Sheets-Sheet 2
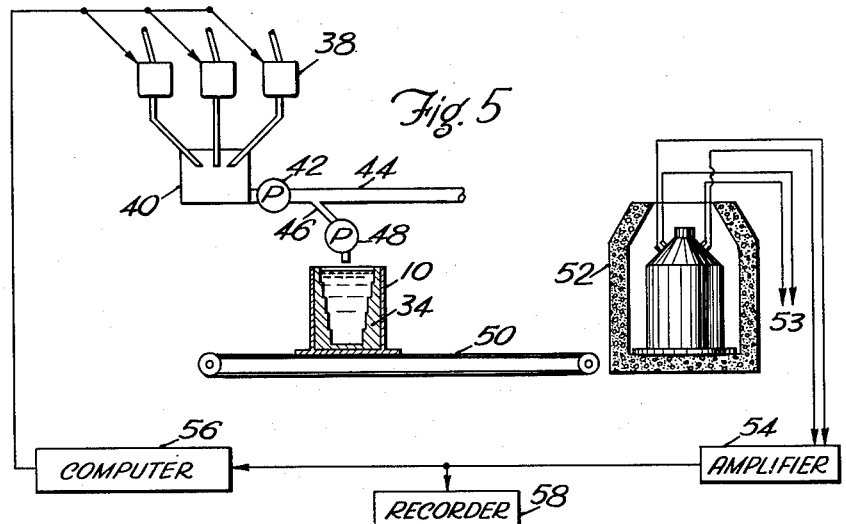
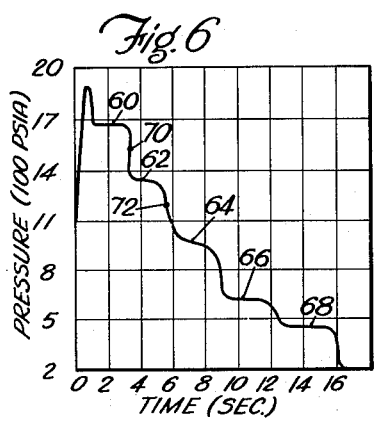
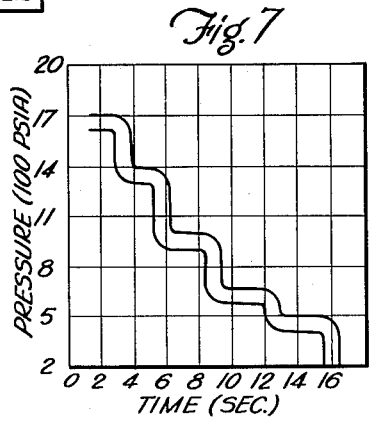
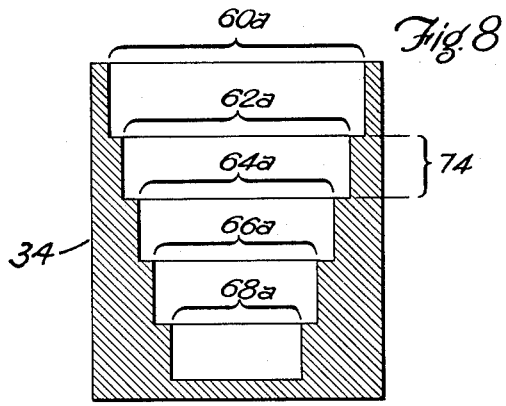
INVENTORS:
V. H. Bryce Wilhite
Joseph R. Barrios
Henry H. Nocke
BY:
ATTORNEYS United States Patent Office 3,191,426
Patented June 29, 1965

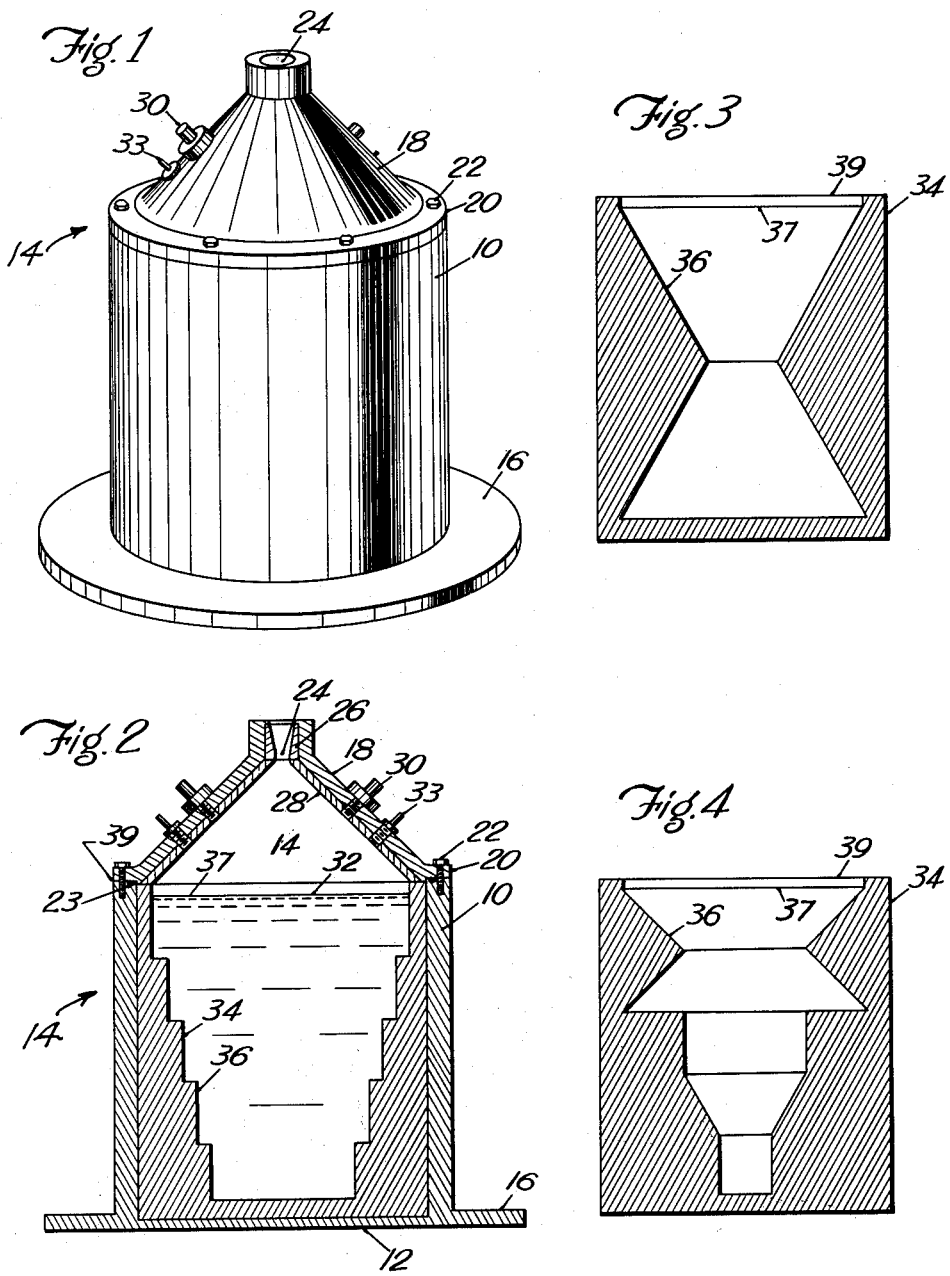

3,191,426
ROCKET FUEL TESTING APPARATUS
Verbon H. B. Wilhite, Brigham City, and Joseph R. Barrios, Ogden, Utah, and Henry H. Nocke, Huntsville, Ala., assignors to Thiokol Chemical Corporation, Bristol, Pa., a corporation of Delaware
Filed Jan. 9, 1962, Ser. No. 165,181
5 Claims. (Cl. 73—35)

This invention relates to apparatus for determining burning rates, at various pressures, of any given substance and it is particularly applicable to quality control of solid, rocket propellants.

In the solid propellant rocket industry, it has not been feasible to depend upon therotical considerations or supposed replication of ingredient proportions to predict the performance of a given mixture of propellant in a rocket engine. Human and physical errors in proportioning and transporting the ingredients of each mixture are an ever-present possibility, and the exact effects produced by various particle-size distributions of oxidizer in the propellant are not fully known. Also, the great expense involved in the construction of a large, solid propellant rocket engine and the potential danger involved if such an engine fails to function properly accentuate the necessity of determining certain properties of each propellant mixture, such as its burning rate, with a considerable degree of assurance, before it is used in a rocket engine.

Therefore, in current practice each individual mixture of propellant is tested, primarily for proper burning rate, by diverting a sample into a small rocket engine, curing the propellant to form a charge having a central cavity, and firing it. The chamber pressure vs. time is recorded during combustion of the propellant. The data thus obtained are used as an indication of the probable performance a propellant charge of the same mixture would have when loaded in a large engine. This method, however, has a number of the following disadvantages: (1) some of the propellants currently in use require approximately four days to solidify sufficiently to be tested in the small engine, during which time the entire mixture begins to cure, hence; (2) the large rocket engine must be filled with propellant before it is known whether the propellant is suitable for use in a large engine; (3) if it is found to be unsuitable, the large engine is very difficult to salvage; and (4) although the instantaneous pressure produced by the conbustion is known, the instantaneous burning rate can only be surmised.

One of the objects of the present invention is to provide a method of and apparatus for quickly and easily evaluating the probable performance which a given mixture of propellant will have after it is cured in a full scale rocket engine.

Still another object is to provide a vented pressure vessel for burning test samples of uncured propellant to enable the burning rate at different pressures to be deduced and compard with a standard.

Other objects and advantages of the invention will become apparent as the following description is read together with the accompanying drawings in which like reference characters denote like parts throughout the several views.

In the drawings:

FIGURE 1 is a perspective view of a pressure vessel incorporating the novel features of the invention;

FIGURE 2 is a vertical section view of the pressure-vessel;

FIGURE 3 is a sectional view similar to FIGURE 2 of a pressure-vessel of modified construction;

FIGURE 4 is a sectional view illustrating another variation of the interior shape of the pressure-vessel;

FIGURE 5 is a schematic diagram illustrating a production system in which the invention may be advantageously used;

FIGURE 6 is a typical chamber pressure vs. time curve produced by combustion of a commonly-used propellant in the device of the invention;

FIGURE 7 is a tolerance chamber pressure vs. time curve of the type used as a standard for comparison with the curve of FIGURE 6; and FIGURE 8 is an enlarged sectional view of the lining insert of the pressure vessel illustrated in FIGURE 2.

The method of the present invention is based on the discovery that the burning pattern of certain liquids, such as the so-called solid rocket propellants before they are cured, is functionally related to the burning pattern of cured propellant so that the probable burning characteristics of a particular batch of propellant can be predicted. In accordance with the method of the present invention, a sample of the liquid or semi-fluid propellant mixture is taken as it comes from the mixer and the sample is burned in a combustion chamber having the same or different burning areas from the top to bottom correlated to the burning areas in the rocket engine in which it is to be used. The burning of the liquid propellant then produces a pressure pattern which is functionally related to the pressure pattern that would be produced in a rocket engine charged with the same propellant in cured solid form. The pressure pattern is then recorded and compared with a standard pattern to determine the probable burning characteristics of the propellant when cured in a rocket engine. This information then can be used to vary the ingredients of the mixture to produce a propellant having the desired characteristics.

A preferred form of apparatus for performing the method of the invention is illustrated in FIGURES 1 and 2 as comprising a hollow cylinder 10, closed at its base 12, and forming the principal member of a pressure vessel 14. The hollow cylinder 10 has an open top to provide access thereto and the base 12 may be extended to form an annular flange 16, as shown, for additional support. The pressure vessel 14 is completed by a hollow conical top closure or cover member 18 having a fastening means, such as the annular flange 20, overlying the top of cylinder 10 whereby the top member 18 may be firmly attached to cylinder 10 by screws 22 or other fastening means, with a sealing gasket 23 therebetween. The top member 18 has a central orifice 24 defined by a refractory lining 26 having a shape to form a venturi throat. Extending downwardly from lining 26 is a hollow conical lining 28 of thermal insulating material which fits the underside of top member 18 and is bonded thereto. The thermal insulating lining 28 may be composed of any of the high-temperature, low-thermal-conductivity materials known in the art, as, for example, graphite, refractory particles suspended in a phenolic-resin matrix or the like. One or more igniters 30 are fixedly attached to the top member 18 and project into the interior thereof. The igniters 30 are positioned in such a manner, depending upon the design of the igniters used, that they will be most effective in igniting substantially the entire upper surface 32 of a combustible substance (such as a rocket propellant) which is to be tested. Igniters 30 are preferably operated by electrically-controlled squibs having cases of sufficient strength and in sufficiently intimate contact with top member 18 to contain the pressure resulting from combustion of the substance being tested. Top member 18 also is equipped with pressure transducers 33 which will indicate the pressure within the vessel by well known responsive elements and electric circuitry.

An expendable, non-combustible and unitary cylindrical lining insert fits inside the pressure-vessel cylinder 10. In its preferred form, the insert 34 is closed at its base. However, the lining 34 also could be open and bonded to the interior of cylinder 10. Lining insert 34 is made of some relatively non-combustible material having a low rate of thermal conductivity, such as any one of the standard, thermosetting, phenolic resins or graphite. The internal surface 36 of insert 34 defines a variable burning surface area for the combustible substance as it burns downwardly. Hence, the surface 36 could be fabricated in virtually any form that is variable in cross-sectional area from its top to its base, as for example, a cone as shown in FIGURE 3, or a composite figure of various diameters as in FIGURE 4. In each construction the diameter of the lining insert 34 remains constant for an increment of distance from the highest feasible level of the combustible substance therein, as shown in FIGURES 2, 3 and 4. The highest feasible level of the propellant in insert 34 may be defined as an arbitrary point 37 slightly below the top edge 39 of insert 34, as shown in FIGURE 3. If the propellant surface were higher than edge 39, the correct burning-surface area would not be presented upon ignition. One form of surface 36, as shown in FIGURE 2, has successively smaller diameters from the highest feasible level of the combustible substance therein to the base thereof, each diameter being constant for fixed incremental sections of height. However, the configuration may take other shapes, the exact inverse of that shown in FIGURE 2 may be used with certain advantages, or a complex of converging and diverging configurations, as illustrated in FIGURES 3 and 4 may be used. Furthermore, it is not necessary for the vertical sections illustrated in FIGURE 2 to be equal to carry out the invention, but for manufacturing convenience it is desirable.

In adapting the invention to testing propellants used in rocket engines, reference is had to FIGURE 5. As shown therein, the ingredients of the propellant are introduced by metering devices 38 into a continuous mixer 40, from which the mixture is fed by pump 42 into a tube 44 leading to a storage container or casting apparatus for loading an empty rocket-engine case (not shown). As the propellant flows through tube 44, a small representative sample is continuously diverted into tube 46 and is metered by pump 48 into a series of the expendable lining inserts 34, installed in their cylinders 10. Conveyor belt 50 periodically conveys a filled insert 34, together with its cylinder 10, to a firing compartment 52, where a top member or cover 18, complete with its pressure transducers 33 and igniters 30, is fastened to cylinder 10.

The igniters 30 are then actuated remotely by electric current from a source, indicated at 53, to ignite the upper surface 32 of the propellant. As the propellant burns, the pressure within the vessel is monitored by the pressure transducers 33.

The pressure transducers 33 may be any of a number of well-known instruments which respond physically and/or electrically to changes in pressure. One type of instrument which can be used for this purpose is a combination of a steady state (strain gauge) and dynamic (piezo-electric) transducers for controlling and producing a resultant electrical potential functionally related to the pressure to which it is subjected. This voltage is then amplified by amplifier 54 and passed into a computer 56 for comparison with a standard program of pressure vs. time obtained from the combustion of a standard propellant. The computer through appropriate means automatically adjusts the metering devices 38 to correct any discrepancies in the burning rates as measured by changes in voltage received from transducers 33 and the standard program.

The electrical signal received from transducers 33 also is fed from amplifier 54 to a recorder 58, as shown in FIGURE 5, where the pressure changes are recorded graphically on a time vs. pressure curve. A resulting curve, typically illustrated in FIGURE 6, has pressure plateaus 60, 62, 64, 66 and 68 which are clearly identifiable as having been produced by combustion of the propellant at burning-surface areas 60A, 62A, 64A, 66A and 68A of FIGURE 8, respectively, with the highest pressure peak of the graph having been produced by the igniters.

The graph, such as illustrated in FIGURE 6, is very valuable in that is furnishes parameters which are important in the design of rocket engines. For example, important data are the chamber pressure, $P_c$, produced by the propellant burning over various burning-surface areas relative to the orifice area; the burning rate, $r_b$, of the propellant; the rate of mass flow, $\dot{m}$, through the nozzle; the characteristic velocity, $C^*$, of the propellant; the burning-rate exponent, $n$; and; the burning-rate coefficient $a_t$, at a given temperature.

Referring to a particular pressure plateau, 62, of FIGURE 6, these parameters may be derived from the graph as follows:

(1) Since inflection point 70 marks the transition of combustion from area 60A of FIGURE 8 to area 62A and inflection point 72 marks the transition of combustion from area 62A to area 64A, the chamber pressure $P_c$ produced by combustion of the propellant at area 62A relative to the orifice area is measured by the transducers 33;

(2) The linear burning rate in inches per second, $r_b$, of the propellant may be found by dividing the height 74 of the cylinder that defines area 62A by the time which elapsed between points 70 and 72 as read from the graph;

(3) The rate of mass flow, $\dot{m}$, through the orifice may be found by dividing the mass of the propellant contained in the cylinder defined by height 74 and area 62A by the time lapse from point 70 to point 72;

(4) The "characteristic velocity" of the propellant may be found by the equation $$C^* = \frac{P_c A_t}{\dot{m}}$$

where $A_t$ is the area of the orifice 24;

(5) The burning-rate exponent, $n$, may be found by the equation $$n = \frac{\partial \log r_b}{\partial \log P_c}$$

and (6) The burning-rate coefficient, $a_t$, may be found by application of Vieille's empirical equation $r_b = a_t P_c^n$, which describes adequately the burning rate of most propellants at high pressures.

It has been found that, in general, solid rocket propellants burn faster in the uncured or fluid state than in the solid state. However, the data obtained from burning the uncured propellant as described can be correlated with that obtained by burning the solidified propellant at the same pressures to predict the probable performance of the propellant charge in a large rocket engine. Hence, once this correlation has been established for a given kind of propellant, all of the necessary data can be obtained by combustion of uncured propellant in the apparatus of the present invention as described.

The invention having now been described, it will be observed that the present invention provides a testing method and apparatus for quickly and easily evaluating the probable performance of a given mixture of propellant before it is cured. It will also be observed that the present invention provides a vented pressure vessel with a venturi for burning test samples of uncured propellant to enable the burning rate at different pressures to be deduced and compared with a standard.

While a preferred form of the invention is herein illustrated and described, it will be understood that changes may be made in the construction and arrangement of elements without departing from the spirit or scope of the invention. Therefore, without limitation in this respect, the invention is defined by the following claims.

We claim:

1. A device for determining burning rates, at various pressures, of combustible substances in one state for predicting the burning rate of the substance in another state comprising a pressure vessel having an orifice in the upper portion thereof, closable access means for the pressure vessel for introducing a substance in one state to be tested therein, ignition means in the pressure vessel, pressure-responsive means within said pressure vessel, means operated by the pressure responsive means for indicating the pressure in the vessel at the exterior thereof, and the interior of said pressure vessel having a contour from the highest feasible level of substance therein to the base thereof in which the internal surface of said pressure vessel defines varying horizontal, cross-sectional areas from the top to the bottom to produce a burning rate in said one state functionally related to the probable burning rate in said other state.

2. A device in accordance with claim 1 wherein the internal surface of the pressure vessel below the highest feasible level of substance therein being tested is formed by the interior of a removable, hollow cylindrical lining that fits inside said pressure vessel.

3. A device in accordance with claim 2 wherein said hollow cylinder is closed at the bottom end portion thereof.

4. A device in accordance with claim 1 having an electrically-actuated igniter for igniting the upper surface of substance to be tested.

5. A device in accordance with claim 1 in which the means operated by the pressure responsive means is an automatic recorder.

References Cited by the Examiner

UNITED STATES PATENTS

| | | | |
|---|---|---|---|
| 2,493,725 | 1/50 | McMorris | 73—35 |
| 2,681,563 | 6/54 | Golden | 73—35 |
| 2,958,288 | 11/60 | Campbell et al. | 102—98 |

OTHER REFERENCES

Dobyns et al.: Rocket Motors Don't Have To Be Expensive. In Astronautics. September 1957, pages 42–44, and 78, 79.

Penner: Qualitative Experimental Verification of the Change of Burning Rate of Rocket Powders with Radiation Path Length. In Journal of Applied Physics 19(6), pages 511–513, June 1948.

Shafer: Solid Fuel Missiles for the Army. In Missiles and Rockets, August 1957, pages 84 and 85.

Crawford et al.: Direct Determination of Burning Rates of Propellant Powders. In Analytical Chemistry, pages 630–633.

RICHARD C. QUEISSER, *Primary Examiner.*